(No Model.) 3 Sheets—Sheet 1.

G. HAVELL & A. H. MEYER.
BICYCLE LAMP.

No. 578,451. Patented Mar. 9, 1897.

Attest:
L. Lee.
Edw. F. Kinsey.

Inventors.
George Havell,
August H. Meyer,
per Thomas S. Crane, Atty.

(No Model.) 3 Sheets—Sheet 2.

G. HAVELL & A. H. MEYER.
BICYCLE LAMP.

No. 578,451. Patented Mar. 9, 1897.

Attest:
L. Lee,
Edw. F. Kinsey.

Inventors.
George Havell,
August H. Meyer,
per Thomas S. Crane, Atty.

THE NORRIS PETERS CO., PHOTO-LITHO., WASHINGTON, D. C.

(No Model.) 3 Sheets—Sheet 3.

G. HAVELL & A. H. MEYER.
BICYCLE LAMP.

No. 578,451. Patented Mar. 9, 1897.

Attest:
L. Lee.
Edw. F. Kinsey.

Inventors.
George Havell, and
August H. Meyer, per
Thomas S. Crane, Atty.

UNITED STATES PATENT OFFICE.

GEORGE HAVELL AND AUGUST H. MEYER, OF NEWARK, NEW JERSEY, ASSIGNORS TO THE HAVELL MANUFACTURING COMPANY, OF NEW JERSEY.

BICYCLE-LAMP.

SPECIFICATION forming part of Letters Patent No. 578,451, dated March 9, 1897.

Application filed July 18, 1896. Serial No. 599,598. (No model.)

*To all whom it may concern:*

Be it known that we, GEORGE HAVELL and AUGUST H. MEYER, citizens of the United States, residing in the city of Newark, county of Essex, and State of New Jersey, have invented certain new and useful Improvements in Bicycle-Lamps, fully described and represented in the following specification and the accompanying drawings, forming a part of the same.

The present invention relates to sundry improvements in the constructive details of bicycle-lamps whereby the parts are fitted and secured together in an economical and effective manner, as will be understood from the following description and the annexed drawings, in which—

Figure 1:
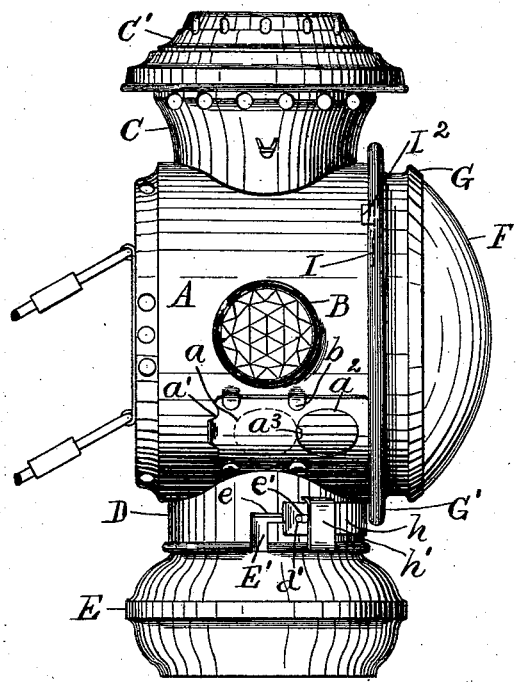
Figure 2:
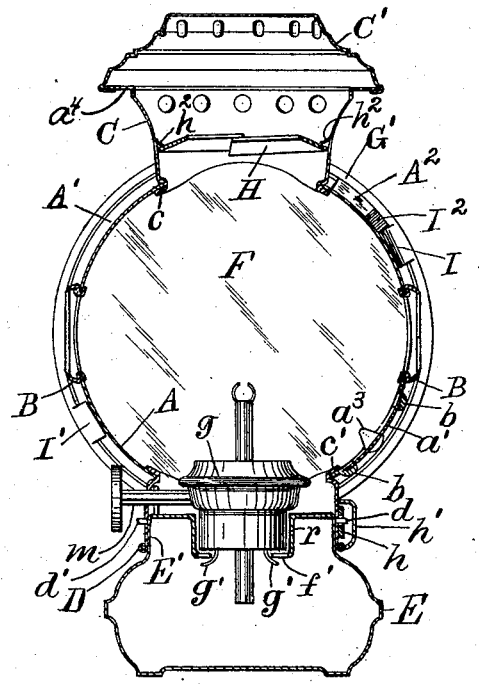
Figure 3:
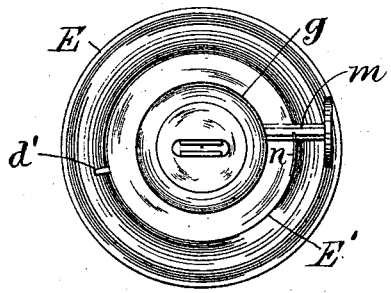
Figure 4:
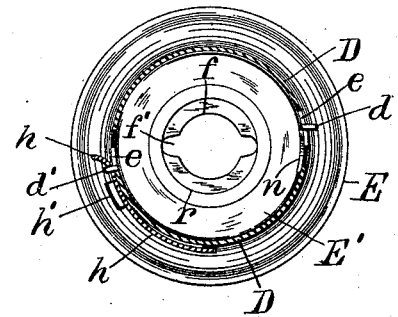
Figure 9:
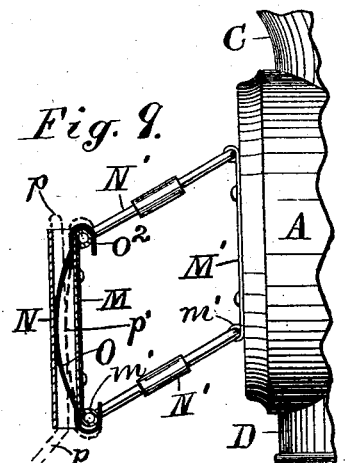
Figure 10:
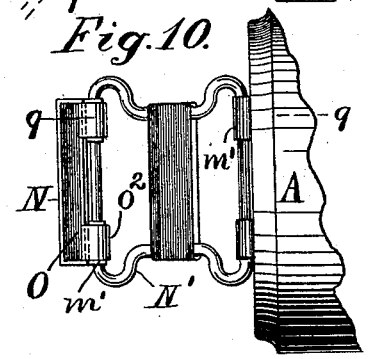
Figure 5:
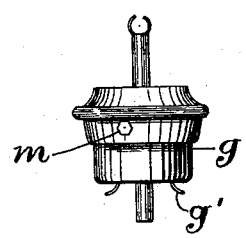
Figures 11, 12:
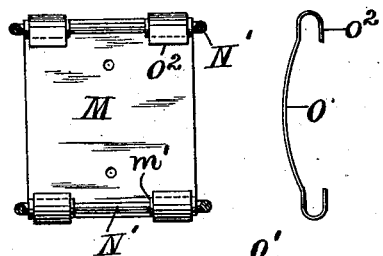
Figure 6:
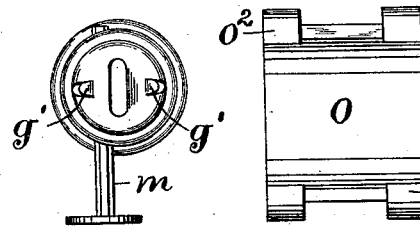
Figures 13, 14:
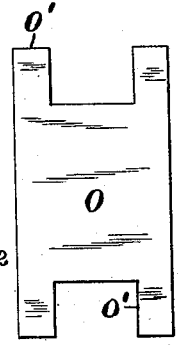
Figure 7:
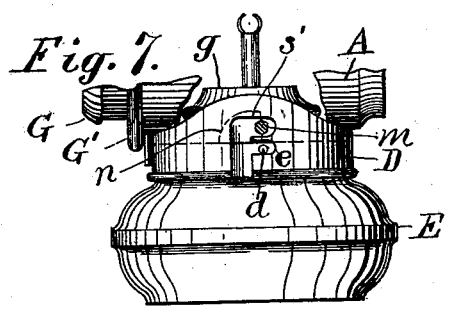
Figure 8:
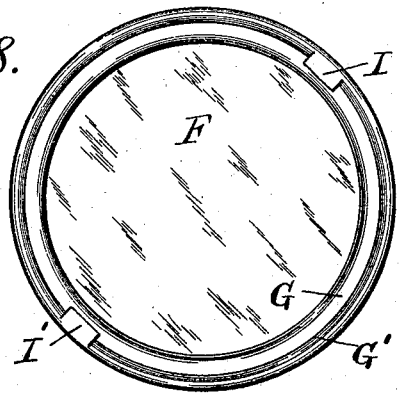
Figure 16:
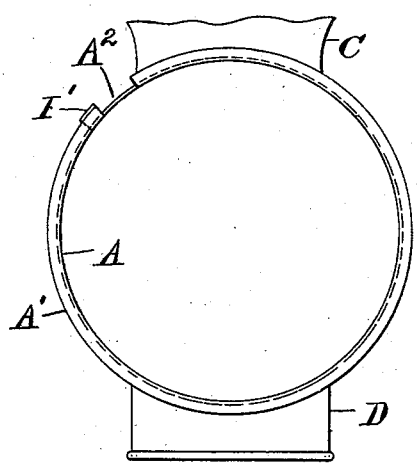
Figure 15:
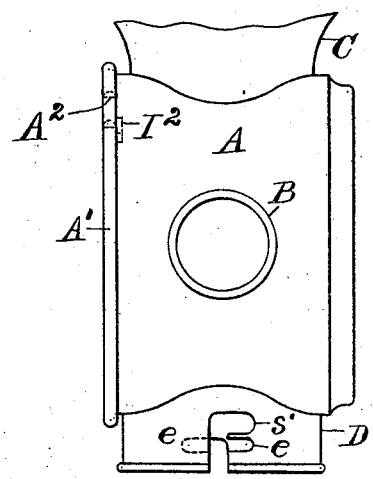
Figure 17:
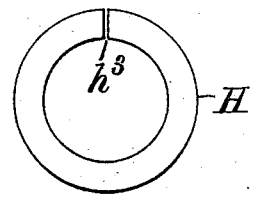

Figure 1 is a side view of the lamp; Fig. 2, a cross-section of the same where hatched upon the center line of the oil-cup, with the side jewels omitted from their bezels. Fig. 3 is a plan of the oil-cup. Fig. 4 is a plan of the oil-cup with the burner removed and the collar of the lamp-body in section thereon. Fig. 5 is an elevation of the lamp-burner. Fig. 6 shows the bottom end of the same. Fig. 7 is an elevation of the oil-cup upon the side opposite to that shown in Fig. 1, with the locking-collar shown broken from the lamp-body. Fig. 8 shows the inner side of the lens and its ring. Fig. 9 is an edge view of the lamp-hanger socket in section on line 9 9 in Fig. 10, with the rear side of the lamp and the connecting-links. Fig. 10 is a plan of the same parts. Fig. 11 shows the inner side of the hanger-socket, with the hanger-links in section. Fig. 12 is an edge view of the clamp-spring; Fig. 13, a view of the inner side of the same detached from the hanger-socket, and Fig. 14 shows the blank for the clamp-spring. Fig. 15 is an edge view of the lamp-body to exhibit the bead upon which the lens-ring is secured, and Fig. 16 is a front view of the same with the lens and its ring removed. Fig. 17 shows the blank for the deflecting smoke-collar, and Fig. 18 the same contracted for insertion in the smoke-funnel.

A designates the lamp-body, formed of a horizontal cylindrical shell, with bead A' upon the front edge and jewels secured in bezels B upon opposite sides. The shell is formed of sheet metal, and the bead A' is formed upon the front end of the cylindrical shell by turning the edge outwardly into a flange and rolling the flange into a hollow bead, as shown in Figs. 15 and 16, the bead thus being integral with the cylindrical body. A flaring funnel C with cap C' is affixed to the top of the body by flange c, and a locking-collar D is affixed to the bottom by flange c'. (See Fig. 2.) The oil-cup E is formed with neck E', fitted inside the collar D, and is provided upon opposite sides with pins d and d' to engage bayonet lock-slots e in opposite sides of the collar D. A leaf-spring h is fitted to one quadrant of the collar D and formed with aperture e' in the end to engage the pin d'. The end of the spring is curved outwardly to slip over the pin when the latter is turned into the horizontal portion of the slot e, and the outwardly-turned end is used to lift the spring when releasing the pin to unlatch the oil-cup. A loop h' is secured to the collar just outside of the spring to limit the movement of the same when bent by the finger.

The oil-cup is formed in the top with recess r, having flange f at the bottom, with notches f' at opposite sides, and the burner g is made with the body and bottom in one piece and fitted to said recess and the bottom provided with opposite integral ears g', (shown in Figs. 2, 5, and 6,) adapted to pass through the notches f' and clamp the under side of the flange.

Fig. 6 shows the holes or slots in the bottom of the burner from which the ears g' are stamped, but such holes are no detriment to the construction, as the burner is not required to retain any liquid or other substance.

The burner is turned by means of the spindle m, which, when the lugs are locked in the flange f, is adjusted to set directly over the pin d, so as to enter the bottom of the bayonet lock-slot in the locking-collar D. A sheet-metal bracket n, Figs. 3, 4, and 7, is projected from the top of the oil-cup neck E' and serves to arrest the feed-spindle m of the burner when in such position. The spindle, as shown in Figs. 2 and 7, is polygonal, and by the contact of its flat sides with the bracket n it is prevented from being accidentally rotated by the jarring of the lamp when in use. The spindle, as shown in Figs. 2 and 7, lies above the pin $d$, and an auxiliary slot $s'$ is formed above the slot $e$, as shown in Fig. 7, to admit such spindle simultaneously with the pin $d$.

Below one of the bezels a lighting-opening $a$ is formed, with integral tongues $b$ at opposite sides, to which is fitted a slide $a'$, having an aperture $a^2$ to match the opening $a$ when the slide is retracted. The lighting-opening is shown of oval or nearly round shape to permit the application of a lighted match or taper through the shell of the body A to the lamp-wick, and the tongues $b$ are stamped from the sheet metal of the shell at the four corners of such rounded opening, with their outer ends attached to the shell and their inner ends bent outwardly and then parallel with the shell, as shown in Fig. 2, so as to admit the slide $a'$ between the shell and tongues. The slide is formed at one side of the aperture $a^2$ with a lug $a^3$, (shown in Fig. 2,) which engages the opposite sides of the opening $a$ to serve as a stop for the slide. Before the lug $a^3$ is bent into the opening $a$ the lug projects longitudinally of the slide into one side of the aperture $a^2$ and thus stands at the edge of the aperture when it is bent inward at right angles, as shown in Fig. 2. The lug serves to contact with both ends of the opening $a$ to arrest the slide when opened and shut, respectively. In practice the lug $a^3$ is formed first in the plane of the slide $a'$ and bent downward into the opening $a$ after the slide is inserted within the lugs $b$. By constructing the lugs $b$ from the metal of the body A and the tongue $a^3$ from the metal of the slide $a'$ a very cheap and simple construction is secured.

Heretofore it has been common in providing ears upon the bottom of a burner to engage a slotted flange like the flange $f$ in Fig. 4 to form such ears upon a separate flange and to solder or fasten such flange upon the bottom of the burner. In this construction the ears $g'$ are made integral with the same piece of metal from which the bottom and body of the burner are formed, and the construction is thus greatly cheapened and simplified.

The cap C' is seamed at the margin over an annular flange $a^4$ upon the top of the funnel C. A smoke-deflecting collar H (shown in Figs. 2, 17, and 18) is formed to spring into the flaring funnel C, where it is retained in its proper position by tongues $h^2$, bent inwardly from the metal of the funnel.

Figure 18:
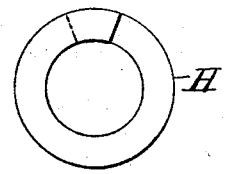

The deflecting-collar is made collapsible by first forming the flat annular blank shown in Fig. 17 with slit $h^3$ at one side, so that the collar may be contracted, as shown in Fig. 18, and thus slipped in the funnel from the lower side. Smoke-outlets $a^5$ are formed in the funnel above the collar H. The expansion of the collar forces it up the flaring sides of the funnel into contact with the tongues $h^2$, and it is thus secured in place without any fastenings whatever.

A bicycle-lamp is usually sustained upon a bicycle-bracket by a socket jointed to the lamp-body by hinge-loops. In the present construction an elliptic spring is fitted within the supporting-socket and provided at opposite ends with hooked lugs, which retain it therein without any solder, rivets, or other fastenings. By this means the spring can be secured in the socket more cheaply, while it is less liable to be lost by the breaking of its fastenings.

The socket N is shown in Figs. 9 and 10 connected with the lamp-body by the usual hinge-links N'. The links N' are jointed to hinge-plates M M', which are secured, respectively, to the socket and the lamp-body, and are formed at the upper and lower corners with hinge loops or eyes $m'$. Between such hinge-loops a spring is usually inserted, which is omitted from the present drawings.

The elliptic spring O is formed from the blank shown in Fig. 14, with straight ears $o'$ upon its corners. The body of the spring is first curved, as shown in Figs. 9 and 12, and after its insertion within the socket, as shown in Fig. 9, the ears are bent in hooked lugs $o^2$, as shown in Figs. 9 and 12, which loosely embrace the hinge-loops $m'$ upon the hinge-plate M and permit the spring to expand when elastically clamping the supporting-bracket $p$, as indicated by the dotted lines $p$ and $p'$ in Fig. 9. The hooked lugs positively prevent the detachment of the spring from the socket, while they involve the use of neither solder nor rivets for fastening it therein.

The fastening of the bull's-eye lens F is equally simple, consisting of a lens-ring G, in which the lens is secured, and which is formed with an annular recess G' to embrace the bead A' upon the front edge of the body. The recess is formed by means of a bead at the outer edge of the lens-ring, and the lugs I I' are projected inward from the opposite edges of the recess G' to fit the rear side of the bead A', as shown in Fig. 2, and a notch $A^2$ is formed in one side of the bead A' to release the lug I when opposite to the same. The lens is secured upon the body by hooking the lug I' over the bead A' in such position that the lug I may be slipped into the notch $A^2$, and then turning the lens-ring so that the lug I slides behind the bead A' until in contact with the stop $I^2$, as shown in Fig. 2. The lugs I and I' are thus brought into such a position that a semirotation of the lens is required to bring the lug I again opposite to the notch $A^2$ to release the lug, and thus detach the lens from the body. This device holds the lens most securely in place, while it permits its detachment without loosening any fastenings, whenever required, to polish the interior of the lens or to expose the inside of the lamp-body.

The whole structure is adapted to be formed in parts made from sheet metal, by tools, in the most rapid and economical manner.

We are aware that a bayonet lock-slot is a common means for attaching the two parts of a lantern; but we are not aware that the oil-cup has ever been formed with a neck having the locking-pins projected directly from its sides and the wick-spindle arranged directly over one of said pins, so as to enter the same bayonet lock-slot as the said pins. With such construction the bayonet lock-slot requires the auxiliary slot $s'$, formed above the slot $e$, which admits the pin $d'$, and such construction we have specifically claimed.

Having thus set forth the nature of our invention, what we claim herein is—

1. In a bicycle-lamp, a cylindrical lamp-body formed of sheet metal having a flange turned outwardly at the front edge and rolled into the annular bead $A'$ with notch $A^2$ in one side, and the lens F having the lens-ring G with bead at the edge forming the annular recess $G'$, and the lugs I, I', projected inward from the bead at opposite edges of such recess and adapted to fit the rear side of the bead $A'$, substantially as herein set forth.

2. In a bicycle-lamp, a sheet-metal lamp-body A of horizontal cylindrical shape with lens attached to the front end, and a substantially round lighting-opening $a$ in the side, with isolated integral tongues stamped from the sheet metal of the shell at the corners of the said opening, and bent outwardly and then parallel with the shell, and a slide fitted between such tongues and the shell and provided with an aperture $a^2$ having the lug $a^3$ formed integral with the slide at one end of the aperture $a^2$, and bent into the opening $a$ to form a stop for the slide when opened and closed respectively, substantially as herein set forth.

3. In a bicycle-lamp, the combination, with the lamp-body and means for securing an oil-cup detachably thereon, of the oil-cup having in the top the recess $r$ with locking-flange $f$ in the bottom provided with notches $f'$, the detachable burner having the body and bottom formed in one piece and fitted within said recess, and the bottom being formed with the opposite integral ears $g'$ stamped from the metal of the bottom, and bent to pass through the notches $f'$ and clamp the under side of the flange $f$ when suitably rotated, substantially as herein set forth.

4. In a bicycle-lamp, the combination, with the lamp-body and means for securing an oil-cup detachably thereon, of the oil-cup having in the top the recess $r$ with locking-flange $f$ in the bottom provided with notches $f'$, the detachable burner having the body and bottom formed in one piece and fitted within said recess, and the bottom being formed with the opposite integral ears $g'$, stamped from the metal of the bottom, and bent to pass through the notches $f'$ and clamp the under side of the flange $f$, the polygonal feed-spindle projected from the side of the burner above the top of the oil-cup, and the bracket $n$ upon the top of the oil-cup to arrest the burner when locked in the recess, and the spindle being held against the bracket by the frictional contact of the lugs $g'$ with the flange $f$, and thus held from rotation, substantially as herein set forth.

5. In a bicycle-lamp having oil-cup at the bottom and smoke-funnel at the top, with smoke-outlets $a$ at the upper end, and tongues $h^2$ bent inward from the sides below such outlets, of the collapsible deflecting-collar H fitted to spring into the funnel in contact with the said lugs, as and for the purpose set forth.

6. In a bicycle-lamp having oil-cup at the bottom and smoke-funnel at the top, with annular flange $a^4$ and perforations at the upper end and tongues $h^2$ bent inward from the sides below such perforations, of the cap $C'$ having its margin seamed over the edge of the flange $a^4$, and the collapsible deflecting-collar H fitted to spring into the funnel in contact with the said tongues, as and for the purpose set forth.

7. In a bicycle-lamp having a socket to embrace a supporting-bracket, the combination, with said socket, of the elliptic spring O having hooked lugs $o^2$ at opposite ends to movably clamp the edge of the socket at the upper and lower ends, substantially as herein set forth.

8. In a bicycle-lamp having a socket N hinged thereto, to embrace a supporting-bracket $p$, with hinge-loops $m'$ at the opposite ends of said socket, of the elliptic spring O having hooked lugs $o^2$ at opposite ends, fitted movably over the said hinge-loops, as and for the purpose set forth.

In testimony whereof we have hereunto set our hands in the presence of two subscribing witnesses.

GEORGE HAVELL.
AUGUST H. MEYER.

Witnesses:
THOMAS S. CRANE,
J. D. CLARK.